US007319465B2

(12) United States Patent
Mikami et al.

(10) Patent No.: US 7,319,465 B2
(45) Date of Patent: Jan. 15, 2008

(54) LOW-POWER DRIVEN DISPLAY DEVICE

(75) Inventors: Yoshiro Mikami, Hitachiota (JP); Hiroki Kaneko, Hitachi (JP); Yasuhiro Mochizuki, Hitachinaka (JP); Katsumi Kondo, Mito (JP)

(73) Assignee: Hitachi, Ltd., Tokyo (JP)

( * ) Notice: Subject to any disclaimer, the term of this patent is extended or adjusted under 35 U.S.C. 154(b) by 243 days.

(21) Appl. No.: 10/648,789

(22) Filed: Aug. 27, 2003

(65) Prior Publication Data

US 2004/0113903 A1 Jun. 17, 2004

(30) Foreign Application Priority Data

Dec. 11, 2002 (JP) ............................ 2002-359618

(51) Int. Cl.
*G09G 5/00* (2006.01)
*G06F 3/038* (2006.01)

(52) U.S. Cl. ...................................... 345/211; 345/212

(58) Field of Classification Search ........ 345/211-213, 345/87, 94, 99, 102

See application file for complete search history.

(56) References Cited

U.S. PATENT DOCUMENTS 5,657,043 A * 8/1997 Fukui et al. ................ 345/100
5,661,349 A * 8/1997 Luck .......................... 307/151
5,761,485 A * 6/1998 Munyan ..................... 715/839
6,348,908 B1 * 2/2002 Richley et al. ............... 345/85
6,518,944 B1 * 2/2003 Doane et al. ................. 345/87
7,088,355 B1 * 8/2006 Ochi .......................... 345/211

FOREIGN PATENT DOCUMENTS

| | | |
|---|---|---|
| JP | 57-97582 | 6/1982 |
| JP | 4-323691 | 11/1992 |
| JP | 5-73117 | 3/1993 |
| JP | 8-286170 | 11/1996 |
| JP | 9-185346 | 7/1997 |

(Continued)

OTHER PUBLICATIONS

Machine translation of JP 2001066573 A.*

(Continued)

*Primary Examiner*—Amr A. Awad
*Assistant Examiner*—Steven E Holton
(74) *Attorney, Agent, or Firm*—McDermott Will & Emery LLP

(57) ABSTRACT

For a display device having a solar cell and a power buffer for keeping stored electric power, a display system which has a low-power drive mode, self-contained power and no need for recharging or power wiring is provided. The display system includes a solar cell using a thin-film semiconductor, a power storage element for temporarily storing the produced power, a driving circuit, a matrix display unit, a display rewrite instruction unit for inputting screen rewrite and a control circuit and starts rewriting a display when power sufficient to rewrite an image screen is stored in the solar cell. The display device having remarkable portability and no limited battery life, which controls a display mode depending on the power produced by the solar cell, can display even when power generation is low and allows self-contained power even if the storage element has a small capacity, can be obtained.

10 Claims, 16 Drawing Sheets

FOREIGN PATENT DOCUMENTS

| | | | | |
|---|---|---|---|---|
| JP | 9-292851 | | | 11/1997 |
| JP | 11-265172 | | | 9/1999 |
| JP | 2000-112441 | A | | 4/2000 |
| JP | 2001066573 | A | * | 3/2001 |
| JP | 2001-136425 | | | 5/2001 |
| JP | 2001-183620 | | | 7/2001 |
| JP | 2001-184033 | A | | 7/2001 |
| JP | 2001-188497 | | | 7/2001 |
| JP | 2002-6316 | | | 1/2002 |
| WO | WO 01/53882 | | | 7/2001 |

OTHER PUBLICATIONS

A.Konno, "Present and future of organic solar cell", *Applied Physics*, vol. 71, No. 4, pp. 425-428, issued by Japan Society of Applied Physics Association, Apr. 10, 2002.

Office Action dated Nov. 22, 2005.

Office Action dated May 16, 2006.

* cited by examiner

LOW-POWER DRIVEN DISPLAY DEVICE

BACKGROUND OF THE INVENTION

The present invention relates to a display device driven by a small amount of power, and more particularly to a low-power driven electronic display device, which is a combination of a solar cell and a liquid crystal device, not requiring recharging and a method for controlling it.

There have been proposed many display devices powered by a power supply using a solar cell or the like. For example, JP-A-2001-184033 discloses a display device which has a display area formed of a solar cell and a liquid crystal material having a memory property and does not need power for displaying. JP-A-5-73117 discloses a technology which connects a power buffer for storing electric power between a solar cell and a display device to drive a display circuit.

A display device having a solar cell as its power supply has a considerable change in supplied electric power depending on an amount of light radiated to the solar cell. Then, when the electric power becomes insufficient, a display cannot be driven, and the display disappears. Therefore, it has been general to add an auxiliary power supply unit for compensation of the power to make it possible to perform the display drive by combining the solar cell with a rechargeable secondary battery even if the solar cell output stops. JP-A-2000-112441 discloses a drive method by which an illumination sensor for detecting an amount of light incident on the solar cell is disposed to reduce power consumption by limiting the power of a backlight for adjusting display luminance when peripheral illumination is high. In recent years, an organic solar cell using a high-molecular or low-molecular organic film is attracting attention as a lightweight and thin unit for realizing a high power capacity. This type of organic solar cell is described in detail in a paper by A. Konno entitled "Present and future of organic solar cell" "Applied Physics" Vol. 71, No. 4 (pp 425 to 428) issued by Japan Society of Applied Physics Association, Apr. 10, 2002.

SUMMARY OF THE INVENTION

As described above, the existing display device having the solar cell as the power supply is generally provided with a large-capacity secondary battery or the like, which can provide power required for the display drive, in addition to the solar cell. Therefore, the device becomes heavy in weight and has a large thickness. It is necessary to connect the display device to an external power supply through an electric cable to recharge the secondary battery, and the portable device cannot be carried when it is being recharged, resulting in limitation of usability. Besides, it is general for a display device provided with an auxiliary lighting device such as a backlight, a front light or the like to switch a display mode so to control the power supply for the backlight so that the power is supplied to the auxiliary lighting device from the solar cell when peripheral illumination, namely brightness of outside light, is intense or from the secondary battery when the illumination is low. When the secondary battery is used to supply power for displaying, it is general to lower the brightness of the display screen in order to suppress the battery from exhausting. As a result, the quality of a displayed image is considerably degraded. No sufficient measures have been considered in order to solve the above-described problems.

It is an object of the invention to provide a display device which is provided with a solar cell and a storage element for continuously storing electric power and has a low-power drive mode, so that its power is self-contained to eliminate the necessity of recharging and power supplying wiring.

In order to achieve the above object, the display device according to one aspect of the present invention comprises a power supply unit for supplying power, a display unit for displaying an image, a data input circuit for inputting display data corresponding to an image to be displayed on the display unit and a control circuit, wherein:

the power supply unit includes a power supply which varies a power supply ability with time, switches plural different power supply abilities or has average produced power lower than average power required to rewrite one image screen, a power storage unit which has a capacity of stored electric power for holding power higher than the average power required to rewrite one image screen and a stored power detecting circuit which detects an amount of electric power stored in the power storage unit;

the power supply is connected to the display unit via the power storage unit;

the display unit includes a matrix display area, in which a large number of pixels having an optical modulating function capable of changing brightness, a reflectance, a transmittance and colors by a voltage or a current are arranged in a matrix, and a driving circuit including a sequence circuit for driving the matrix display area;

an input of the data input circuit is connected to a data input terminal, and an output is connected to the driving circuit of the display unit;

the pixels have a pixel memory for holding display data and are driven according to a pixel rewrite period for rewriting a display content of the display unit and a pixel holding period for holding the display content; and the control circuit controls the driving circuit to rewrite the display content of the display unit in response to output of a stored power detection signal having detected an amount of stored electric power not less than the average power required to rewrite at least a screen from the stored power detecting circuit so to rewrite the screen of the display unit.

The display device according to another aspect of the invention includes the solar cell, the display unit and the power storage unit which is between them and stores power required to drive a display by a secondary battery or a capacitor and supplies electric power to the display unit via this power storage element. The display device includes a stored power detecting circuit which is connected to the power storage unit, monitors an amount of stored electric power and generated electric power, and generates stored power level signals indicating that power required for driving, power capable of performing scan driving to rewrite a display content and power for continuous rewriting are stored.

The display device according to another aspect of the invention includes a pixel memory for storing a display content and a pixel driving circuit for driving the pixel for each pixel of the display unit. The pixel memory rewrites the contents of the pixel memory by line sequential scanning drive, and the pixel driving circuit changes a transmission and a reflectance according to the display content stored by the pixel's memory function so to display.

The display device according to another aspect of the invention includes a display turning instruction unit such as a push button switch, a mouse, a pen or the like for instructing a display of a still picture, turning of a still picture and a change of a moving picture display mode and a control circuit for controlling the scanning drive to conduct a rewrite operation for rewriting a display when a signal of a rewritable stored power level is effective.

The display device according to another aspect of the invention includes a control circuit, and the control circuit controls the scanning drive in response to a display turning instruction given by a push button switch, a mouse, a pen or the like for instructing to vary a display so to conduct the rewrite operation for continuously rewriting a display when a signal of a continuously rewritable stored power level is effective.

The display devices according to the aspects of the invention configured as described above perform the display operation according to the following procedure. (a) The solar cell converts incident light energy into electric power. The power storage unit stores the produced electric power. The stored power detecting circuit monitors an amount of stored electric power of the power storage unit and produces signals of plural stored power levels indicating that power required for driving, power capable of conducting scanning drive to rewrite the display content and power capable of rewriting continuously have been stored. (b) The memory function of the pixel stores the display content of each pixel by the line sequential scanning drive, and the pixel driving circuit changes and shows a transmittance and a reflectance according to the display content stored by the memory function of the pixel. (c) The control driving circuit detects the display rewrite instruction which is given by the push button switch, mouse, pen or the like instructing a display change and also detects which of the signals of plural stored power levels is effective, and when a rewritable stored power level signal is effective, controls the scanning drive so to execute the rewrite operation to rewrite the display, and when a continuously rewritable stored power level signal is effective, controls the scanning drive so to conduct the rewriting operation to continuously rewrite the display.

Other objects, features and advantages of the invention will become apparent from the following description of the embodiments of the invention taken in conjunction with the accompanying drawings.

DETAILED DESCRIPTION OF THE EMBODIMENTS

Figure 1:
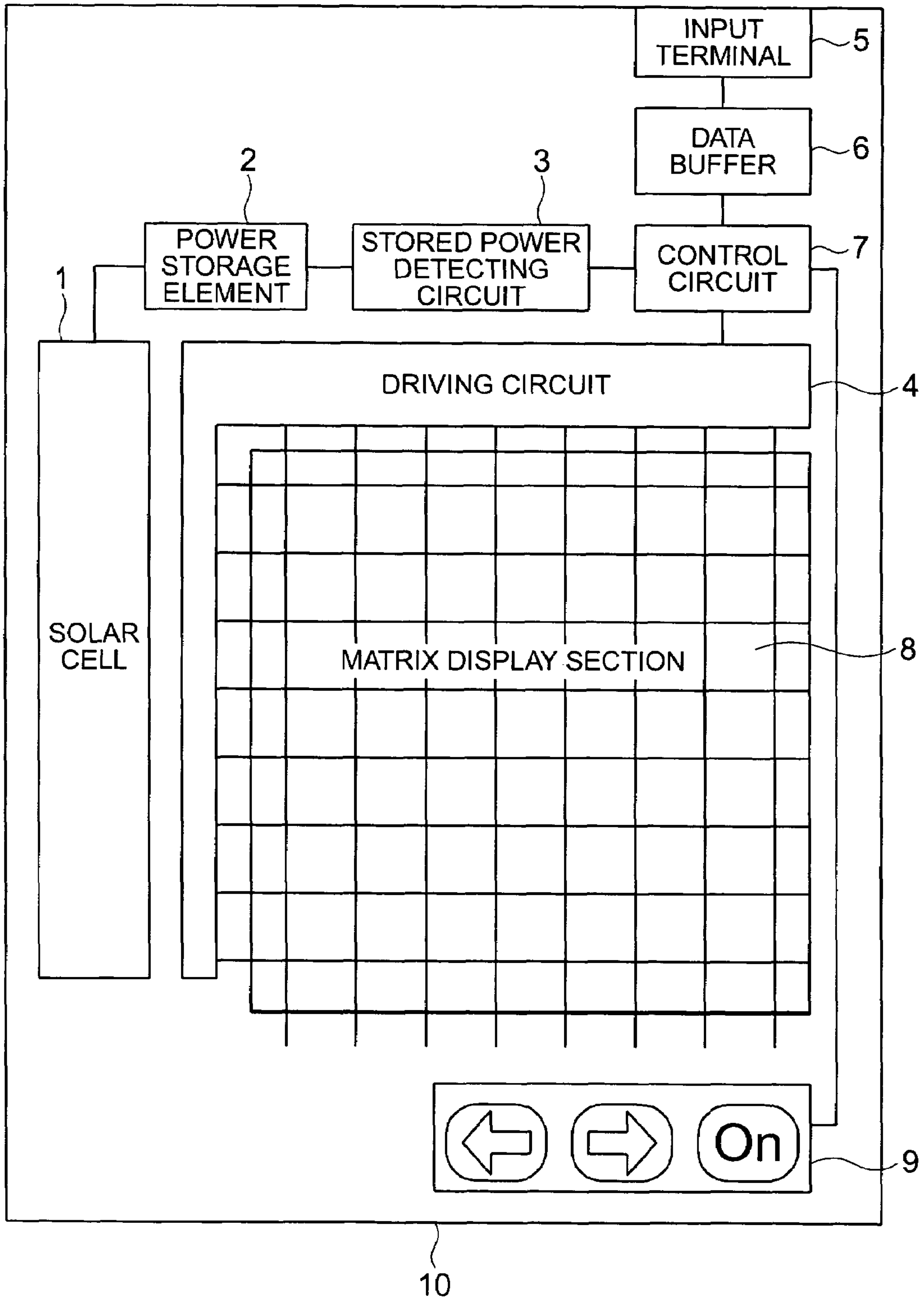
FIG. 1 is a system structure diagram of the display device according to a first embodiment of the invention.

The liquid crystal display device of the invention will be described in detail with reference to the drawings of the embodiments. FIG. 1 shows a system structure diagram of the display device according to the first embodiment of the invention. The display device of this embodiment is a reflective liquid crystal display panel. The liquid crystal display panel has a matrix display unit 8 and supplies electric power from a power supply unit, which is comprised of a solar cell 1, a power storage element 2 configuring a power storage unit and a stored power detecting circuit 3, to a driving circuit 4 via a control circuit 7 to drive the matrix display unit 8. Display data is input from an unshown external signal source through an input terminal 5 and supplied to the driving circuit 4 through a data buffer 6 and the control circuit 7. The data buffer 6 stores one frame of display data. The above components are disposed on a substrate 10, which is preferably a glass substrate, to form a sheet display device. The glass substrate will be simply referred to as the substrate in the following description.

The display device of this embodiment is an active matrix type using an active element such as a thin film transistor for selection of pixels of the matrix display unit 8. A liquid crystal display panel (TFT-LCD) using thin-film transistors (TFT) as the active elements will be referred to as an example in the following description. And, the TFT-LCD displays in a reflective display mode, and the driving circuit 4 is integrated on the substrate 10 to have a combined structure of an LSI (Large Scale Integrated Circuit) and a polysilicon (poly-Si) thin-film transistor to realize a high-resolution display. The solar cell is produced by a low-temperature process using an organic thin-film material after forming the polysilicon TFT. The thin-film solar cell is formed by this process on the same substrate as the display device without affecting on the properties of the polysilicon TFT to realize a thin and lightweight type. A switch 9 for generating a signal to switch a display content is also disposed on the substrate 10 to instruct the control circuit 7 to switch the screen.

Figure 2:
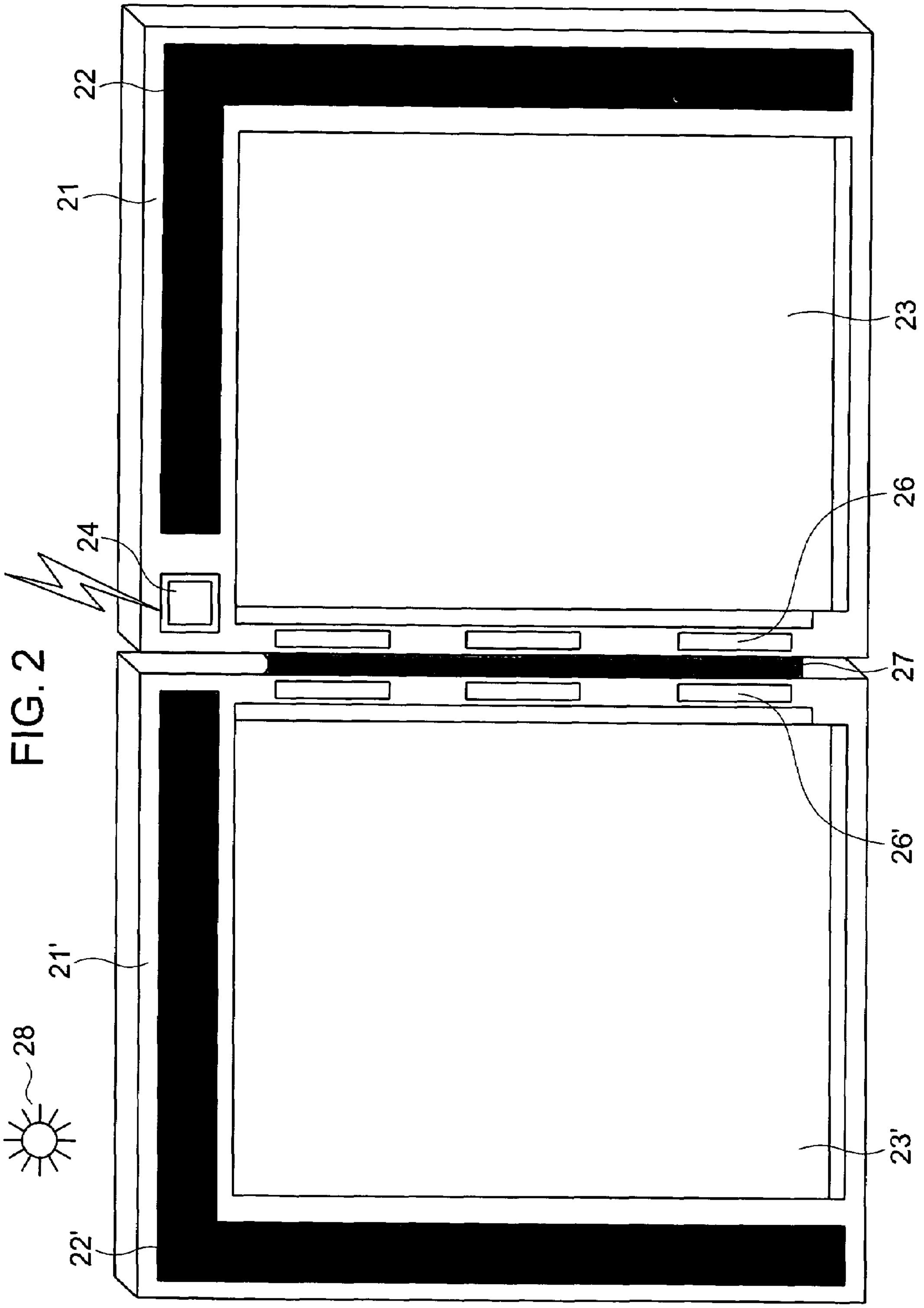
FIG. 2 is an appearance diagram of the display device according to the first embodiment of the invention.

FIG. 2 shows an appearance diagram of the display device according to this embodiment. The display device is comprised of two substrates 21, 21'. The two substrates 21, 21' are mutually connected by a film connection unit 27 including a wiring function and respectively have solar batteries 22, 22', display regions 23, 23' and driving circuit LSIs 26, 26' mounted thereon. And, a data I/O LSI 24 is mounted on the substrate 21. The solar cell 22 generates electric power from the outside light of the sun 28 or the like to drive the matrix display unit 8 (FIG. 1) of the display area 23 as the display unit. The data I/O LSI 24 has a radio interface to input display data by radio data communications and transfers it to the display unit formed of the matrix display unit 8.

Figure 3:
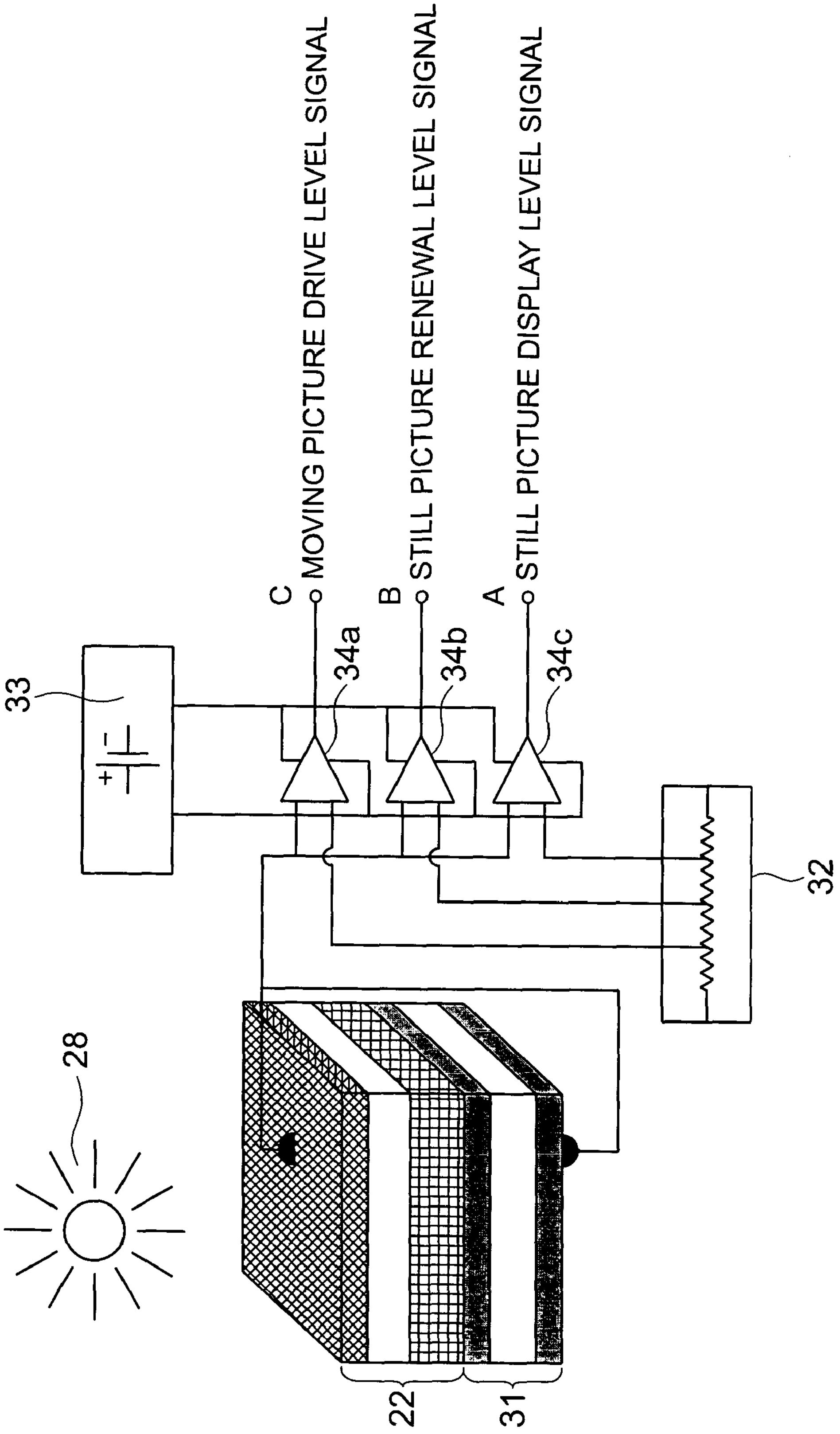
FIG. 3 is a structure diagram of the power supply unit of the display device according to the first embodiment of the invention.

FIG. 3 shows a structure diagram of the power supply unit of the display device of this embodiment. An organic thin-film solar cell is used for the solar cell 22 (the power supply unit of the solar cell 22' of FIG. 2 also has the same structure, so that the description is limited to the solar cell 22 here). And, a large-capacity capacitor 31 is laminated as a lower layer of the solar cell 22 to form the power storage element. The capacitor 31 is a thin-film transistor (hereinafter simply referred to as the TFT) having a MOS structure. Thus, there is an advantage that the TFT's capacitance between layers can provide a larger capacity. This structure has advantages that a withstand voltage is high, and a high yield can be obtained. The capacitor 31 may be formed to have a structure having an insulating layer sandwiched between metal layers.

Both the solar cell 22 and the capacitor 31 are required to have a large capacity, but the solar cell 22 is required to be positioned on the surface of the device in order to obtain high photoelectric conversion efficiency, so that the capacitor 31 can be disposed as the lower layer of the laminated structure to provide a large area. And, there is an advantage that the capacitor 31 can be formed without increasing the number of processes because a thin film formed by the TFT process can be used. It is not shown in the drawing but a single element of the solar cell has a low voltage, so that a voltage necessary for the system can be obtained by disposing plural cells in a series structure.

Thus, the stored power detecting circuit for measuring an amount of electric power stored in the power storage element is comprised of a voltage reference circuit 32 and comparators 34*a*, 34*b*, 34*c* driven by a power supply 33. The voltage reference circuit 32 supplies a different potential to the comparators 34*a*, 34*b*, 34*c* to compare the potential with the voltage of the capacitor 31 so that the stored electric power can be detected accurately. In this embodiment, as a method of rewriting a display, for example three levels, namely a still picture display level signal A capable of displaying and maintaining a still picture, a still picture renewal level signal B corresponding to power capable of rewriting a still picture one time, and a moving picture drive level signal C corresponding to power capable of continuously rewriting at least two still picture screens, are detected.

To configure the solar cell, a thin-film solar cell or a solar cell using an organic thin-film semiconductor such as a conjugated polymer or a dye sensitizing system can be used for amorphous silicon, polysilicon (poly-Si). As shown in FIG. 2, the solar cell 22' can also be formed on the other substrate 21'. Besides, the solar cell formed on a monocrystalline silicon substrate may be adhered to one of the substrates. When the solar cell is also formed on the other substrate, the conversion efficiency is improved, and a disadvantage of using a single solar cell can be compensated. Thus, a yield is advantageously improved.

Figure 4:
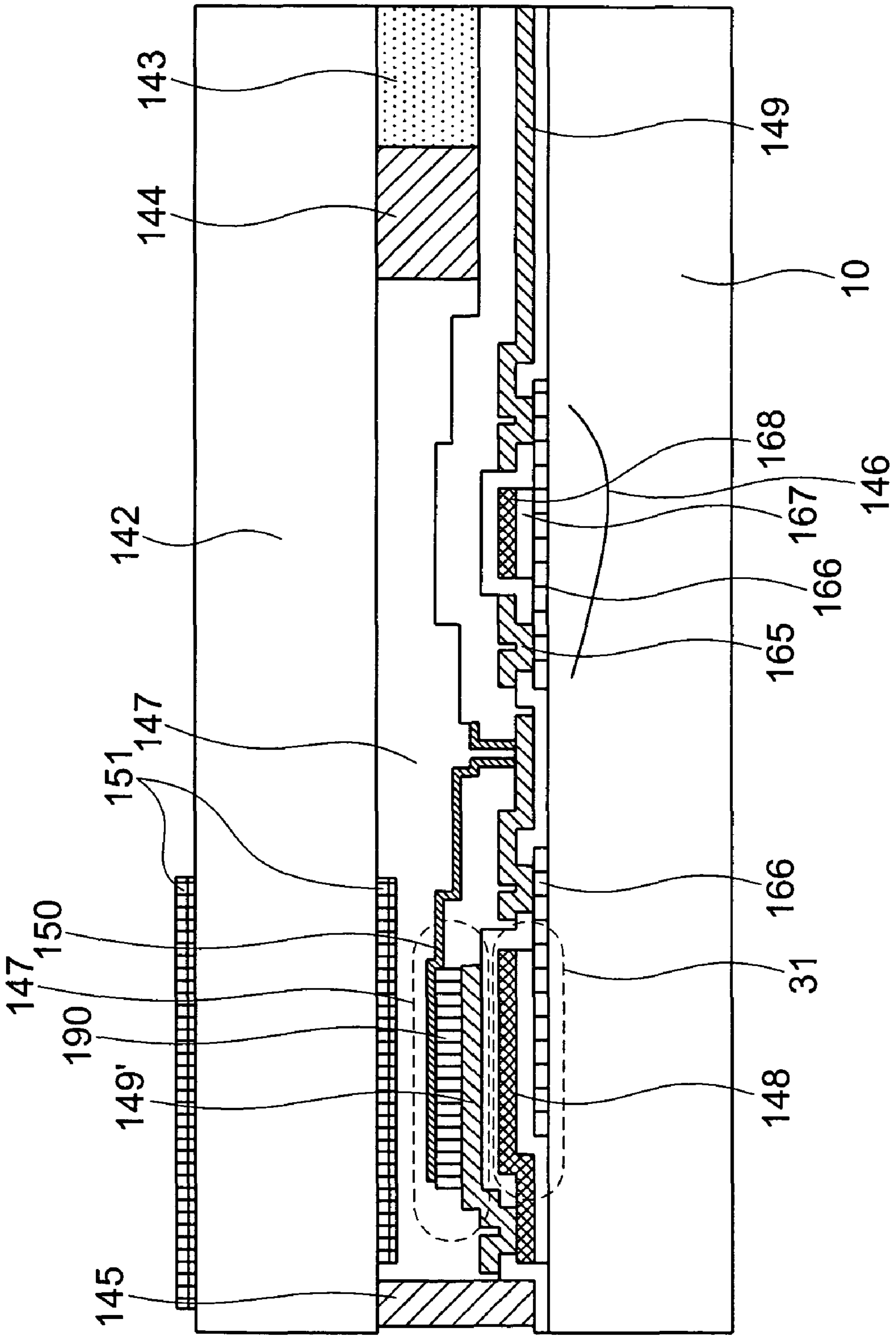
FIG. 4 is a schematic unital diagram illustrating a structure example of a substrate of the display device according to the first embodiment of the invention.

FIG. 4 shows a schematic unital diagram of a structure example of the substrate of the display device according to this embodiment. A polysilicon TFT 146 and a thin-film solar cell 147 are formed on the glass substrate 10. The polysilicon TFT 146 is formed by a common method. Specifically, an amorphous silicon film is formed on the glass substrate 10, polycrystallized by laser annealing and patterned to form an island-shaped silicon 166, then a gate insulating film 167 is formed, a gate electrode 168 is formed, and a MOS transistor having a source and a drain formed by doping is produced. Then, a wiring layer 165 and an aluminum (Al) electrode 149 as a pixel display electrode are formed. A maximum temperature of the polysilicon TFT 146 in its production process is a little lower than 400° C. at which the gate insulating film 167 is formed. After the polysilicon TFT 146 is produced, the solar cell 147 is formed. The production process is simplified by forming the MOS capacitor 31 below the solar cell 147 by a polysilicon TFT process to make the wiring layer 165 on the surface also serve as an electrode 148 of the solar cell 147.

The solar cell 147 has an organic thin-film structure using a conjugated polymer. Because the display device is a reflective display device, it is observed from the surface of the glass substrate 10, which is the TFT substrate, when the display device is used. At this time, light incident on the solar cell 147 is also from the surface of the substrate 10. Therefore, a metal electrode is necessary on the substrate surface, and a transparent electrode structure is necessary on the surface, so that an organic semiconductor layer 190 is formed on an AL electrode 149' of the wiring layer 165 formed by the polysilicon TFT forming process. First, as an n-type layer, a conductive polymer such as C60, PCBM or MEHCN-PPV, which is a material for an electron acceptor, is dissolved in a solvent of chloroform or the like and is applied by spin coating and dried. The formed film is determined to have a thickness of approximately 50 nm after drying.

Then, as a p-type semiconductor, a π conjugated polymer such as PEDOT, P3DOT, POPT or MDMO-PPVMEH-PPV which is to be an electron donor is dissolved in a solvent of toluene, xylene or the like which has a polarity different from that of a base layer, and a film is laminated by spin coating and dried. The p-type layer is determined to have a thickness of 50 nm after drying. Lastly, as a transparent electrode 150, an ITO is formed as a film having a thickness of 70 nm by ion beam sputtering. An element of the solar cell 147 is degraded its electric generating property by a water content, so that it is sealed together with dry nitrogen airtight by a liquid crystal seal 144 and a solar cell seal 145 for sealing an opposed substrate 142 and a liquid crystal layer 143.

By configuring as above, the single opposed substrate 142 can serve as the liquid crystal seal 144 and the solar cell seal 145 of the display unit, making the configuration simple. Especially, reduction of reflected light of the opposed electrode 142 in the solar cell unit is advantageous in terms of improvement of the power generating efficiency, so that an antireflective film 151 is coated as a multilayered film on the solar cell unit. As a sealing material, an ultraviolet-curing resin is used for both of the liquid crystal seal 144 and the solar cell seal 145. Thus, thermal processing is eliminated in the sealing process, and the solar cell elements can be prevented from degrading.

As the solar cell, a hole transporting layer of pentacene-evaporated thin film, OMeTAD or the like may be used as a low-molecular-weight conductive organic semiconductor, and as an inorganic semiconductor thin film, an amorphous Si film may be formed by a PECVD method. In either case, the thin-film solar cell is formed after the polysilicon TFT is formed by a low-temperature process at a temperature of not more than the process temperature of the polysilicon TFT. Thus, the properties of the polysilicon TFT can be prevented from degrading, and the display unit and the solar cell can be formed on the same substrate.

Figure 5:
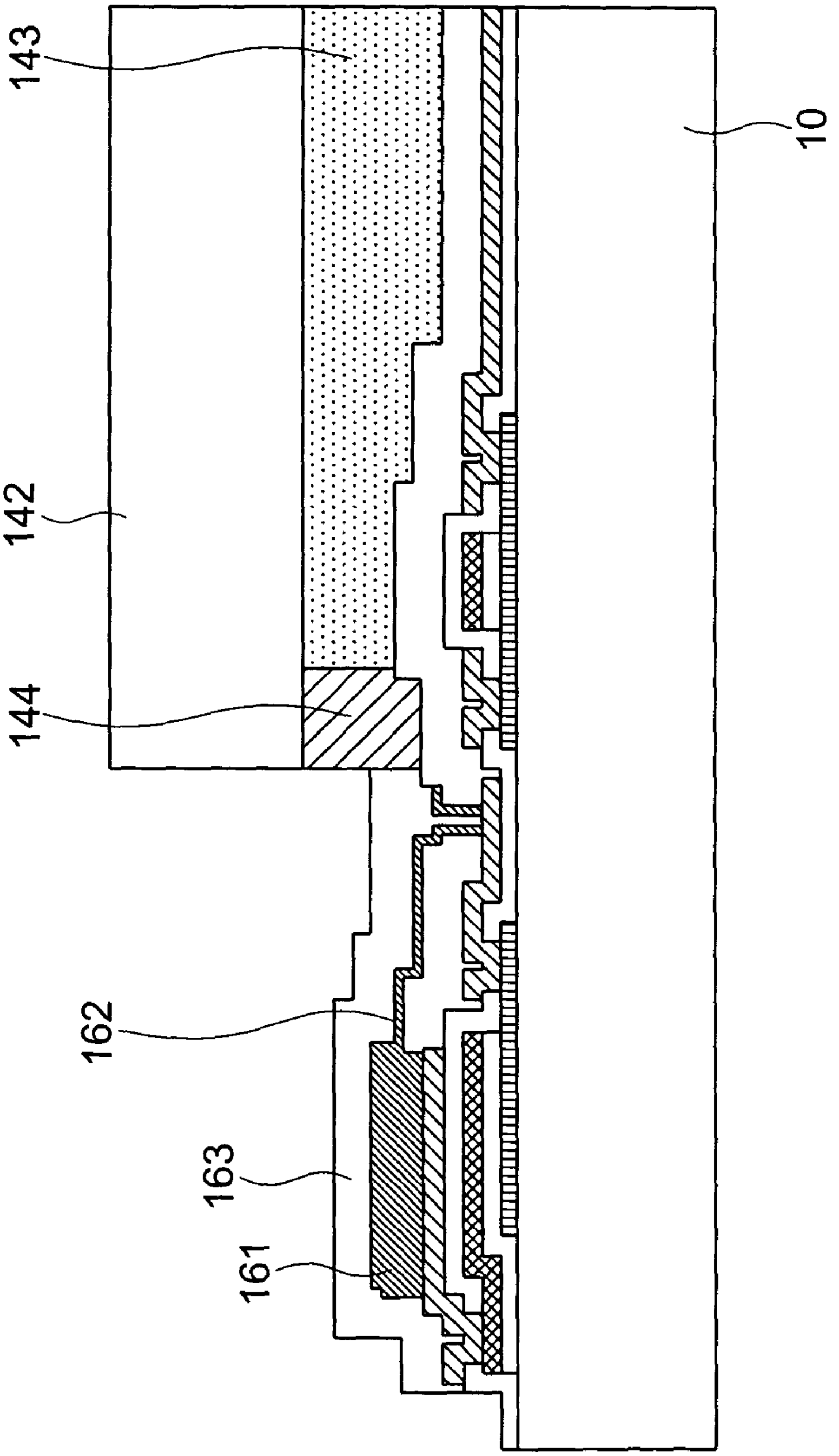
FIG. 5 is a schematic unital diagram illustrating a structure of a substrate of the display device according to a modified example of the first embodiment of the invention.

FIG. 5 shows a schematic unital diagram of a structure of the substrate of the display device according to a modified example of the first embodiment of the invention. When amorphous silicon is used for this solar cell unit, a passivation layer 163 of an inorganic thin film may be formed on a transparent electrode 162 of the solar cell as shown in FIG. 5. An SiN is used as a material for the passivation layer 163 and formed into a film by a plasma CVD method at a low temperature. An amorphous silicon layer 161 is used for the solar cell. By configuring as shown in FIG. 4, when incident light enters the surface of the solar cell, the light entering through the glass substrate 142, which is an opposed substrate, does not reflect on the interface. Thus, it is advantageous that the light enters the solar cell without any loss. In this case, only the liquid crystal seal 144 is used for sealing because the sealing of the two substrates is to seal the liquid crystal. An epoxy resin is used for the liquid crystal seal 144.

Figure 6:
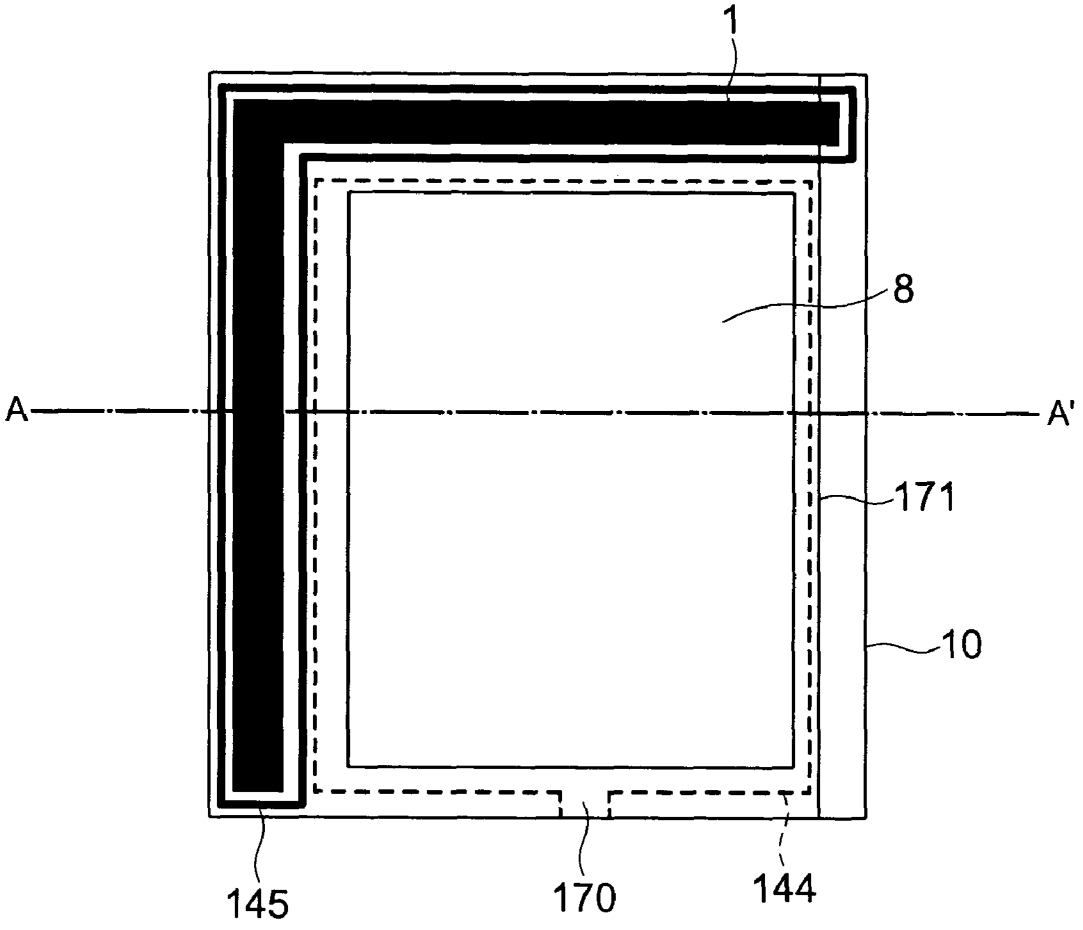
FIG. 6 is a top view illustrating a seal pattern example according to the first embodiment of the invention.

FIG. 6 is a top view illustrating a seal pattern example of this embodiment. FIG. 4 is equivalent to the cross unit taken along line A-A' of FIG. 6. The matrix display unit 8 as the display region and the solar cell 1 are disposed on the substrate 10. The solar cell seal 145 and the liquid crystal seal 144 are disposed as seals for sealing them as shown in FIG. 6. The TFTs are formed on the substrate 10 to form the solar cell 1, which is then adhered to an opposed substrate 171, and the liquid crystal is sealed by a vacuum sealing method. At this time, the solar cell 1 is not disposed at a sealing port 170 and disposed on the side not having the terminal unit (right side in FIG. 6). Disposition of the sealing port 170 at the pertinent position provides advantages that the disposition area of the solar cell is not decreased, a mounted area of the terminal unit can be used effectively, generated high electric power can be obtained, and the terminal to be disposed at the terminal unit can have a large connection pitch. In other words, the side, on which the sealing port 170 is formed, is suitably the side shown in FIG. 6, where the opposed substrate 171 and the substrate 10 have substantially the same end, and essentially disposed on the side where at least the solar cell 1 is not formed. It is necessary to dispose the organic solar cell not to come into contact with the liquid crystal because it melts in a solvent. Therefore, it is significant to dispose outside of the liquid crystal seal as shown in FIG. 6.

As shown in FIG. 1, the solar cell 1 is disposed away from the operating switch 9. When the operating switch 9 is disposed near the solar cell 1 or overlapped with it, the operation on the screen blocks the solar cell, resulting in considerably lowering the power generating ability. Therefore, it is useful to dispose the solar cell 1 and the operating switch 9 away from each other to provide an effect of improving a power supplying efficiency.

Figure 7:
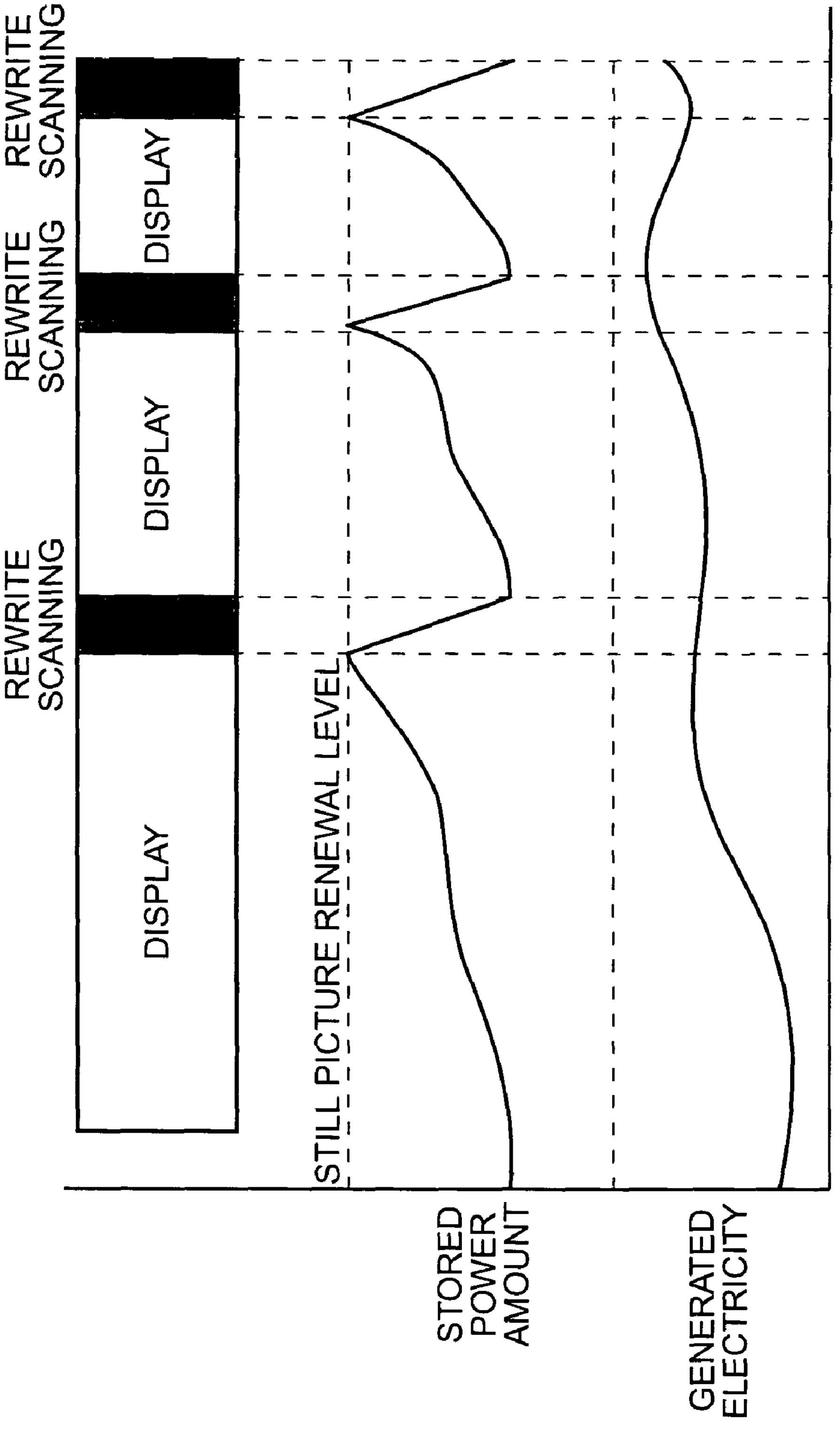
FIG. 7 is a diagram illustrating rewriting of a display screen and an amount of stored electric power of the power supply unit according to the fist embodiment of the invention.

Then, the drive control of the display unit will be described. FIG. 7 is an explanatory diagram to show rewriting of the display screen and an amount of stored electric power of the power supply unit. An amount of electric power generated by the solar cell is not uniform but variable depending on an amount of outside light, and an amount of electric power or electric charge stored in the power storage element increases gradually with time but its increase rate is not uniform. Therefore, power required to rewrite one screen is converted into a voltage, and the rewriting operation is started when it is detected that the voltage has become a level for renewal of a still picture. Because the power is consumed during the rewrite scanning, the amount of stored electric power drops as shown in the drawing when an amount of electricity generated is not more than the power consumption during the operation of the scanning circuit. After scanning for the rewrite period, the amount of stored electric power is increased again by the power from the solar cell. Thus, the screen rewrite scanning is intermittently operated every time the amount of stored electric power reaches prescribed power, so that the driving can be conducted with the power consumption minimized.

Figure 8:
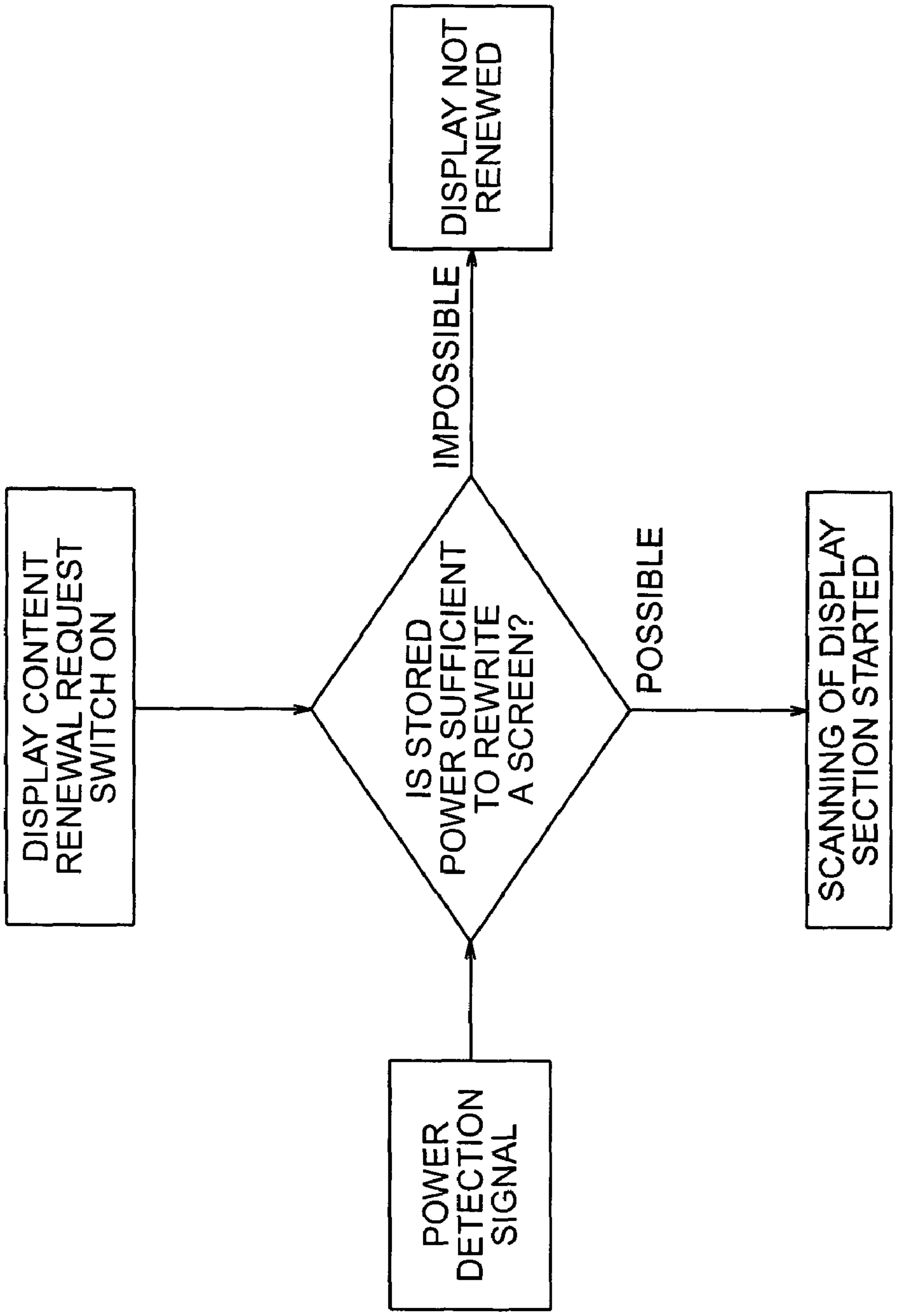
FIG. 8 is a diagram illustrating a relationship between an operation of a display changeover switch and an amount of stored electric power related to the control for rewriting a display according to the first embodiment of the invention.

And, for the control of rewriting of a display, the operation of the display changeover switch 9 and the amount of stored electric power are linked to realize a low power type. FIG. 8 is an explanatory diagram showing the linkage of the operation of the display changeover switch and the amount of stored electric power in connection with the control of the rewriting of a display. In FIG. 8, when a switch for requesting switching of the display is depressed by a user, the presence or not of an electric power detection signal for detecting whether power required for rewriting one screen has been accumulated is detected, and when the signal is effective, the display turning operation is performed. But, if the power is insufficient, it is controlled not to rewrite. Thus, the display turning is controlled so that the display turning power is saved unless the switch 9 is depressed, and if the power is insufficient even when the switch 9 is depressed, driving is performed with the rewriting stopped and the display maintained without renewing so to reduce the power consumption. Thus, a low power type can be realized.

Figure 9:
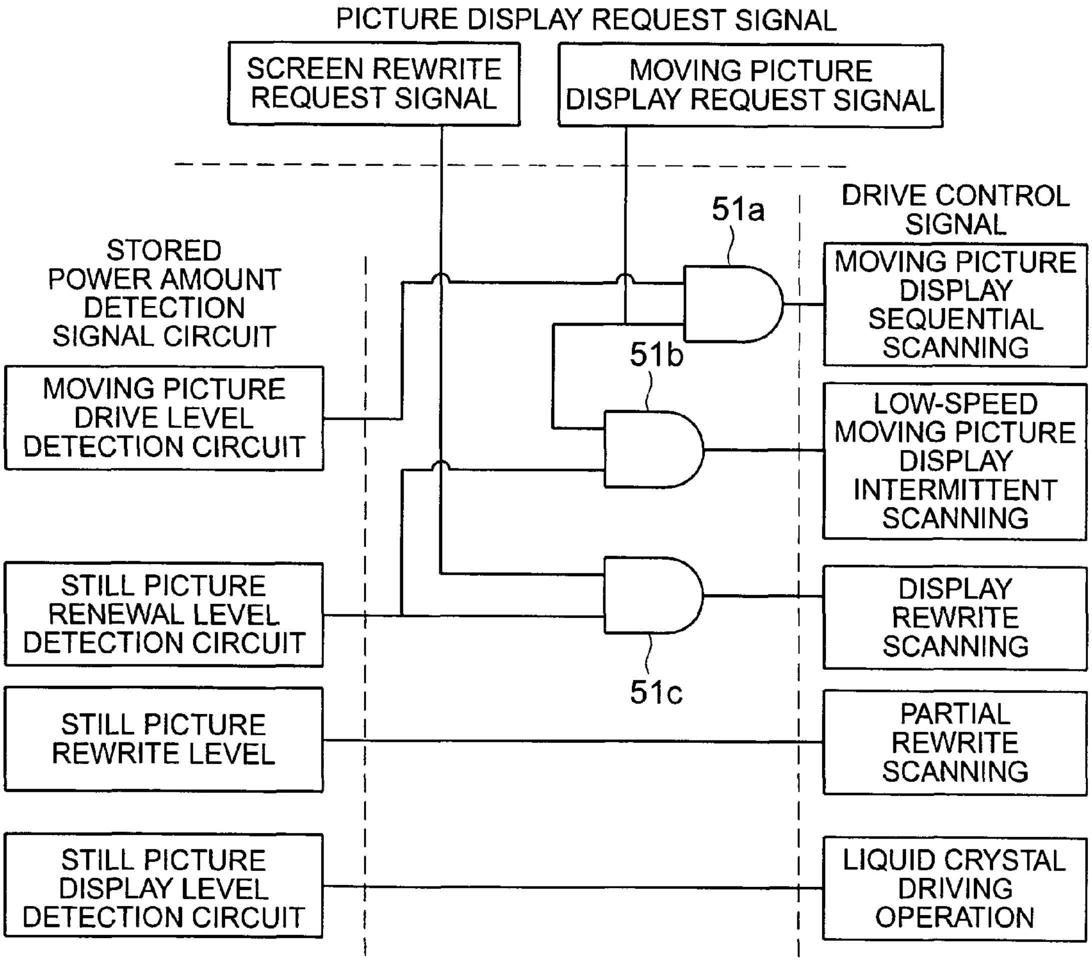
FIG. 9 is an explanatory diagram of control logic when a moving picture is shown in addition to the rewriting of a still picture when displaying according to the first embodiment of the invention.

FIG. 9 is an explanatory diagram showing control logic of displaying a moving picture in addition to the rewriting of a still picture. To display a moving picture in addition to the rewriting of a still picture, the control is made according to the control logic shown in FIG. 9. An amount of stored electric power of the storage element is detected for three levels, namely a still picture display level signal A, a still picture renewal level signal B and a moving picture drive level signal C according to the circuit structure as shown in FIG. 4 to change to logical signals. And, as a logical signal indicating an image rewriting request, demand signals for a still picture screen rewriting and moving image display are used to obtain a drive control signal by logical operation circuits 51*a*, 51*b*, 51*c* as shown in FIG. 9. If the signal is lower than the still picture display level, all the three types of level signals become invalid, and a liquid crystal display is stopped. When the still picture display level signal A becomes valid, an operation signal for liquid crystal display driving is output to supply electric power required for displaying on a pixel unit. A partial rewrite operation can be made between the still picture display level and the still picture screen rewrite level. Minimum information can be renewed by rewriting a required portion in substantially the display portion only.

When the still picture renewal level signal B is valid and the screen rewrite request signal is effective, the display rewrite operation signal becomes valid, and a scanning drive of the display circuit is performed for one screen only so to rewrite the display. And, when there is a moving picture request signal, a slow-speed moving picture is displayed. Because a display screen changes every time the rewrite power is obtained, a slow moving picture can be displayed. When the moving picture drive level signal C is valid, a still picture is repeatedly displayed when there is a still picture rewrite request signal, and the moving picture is continuously rewritten when there is a moving picture request signal.

Figure 10:
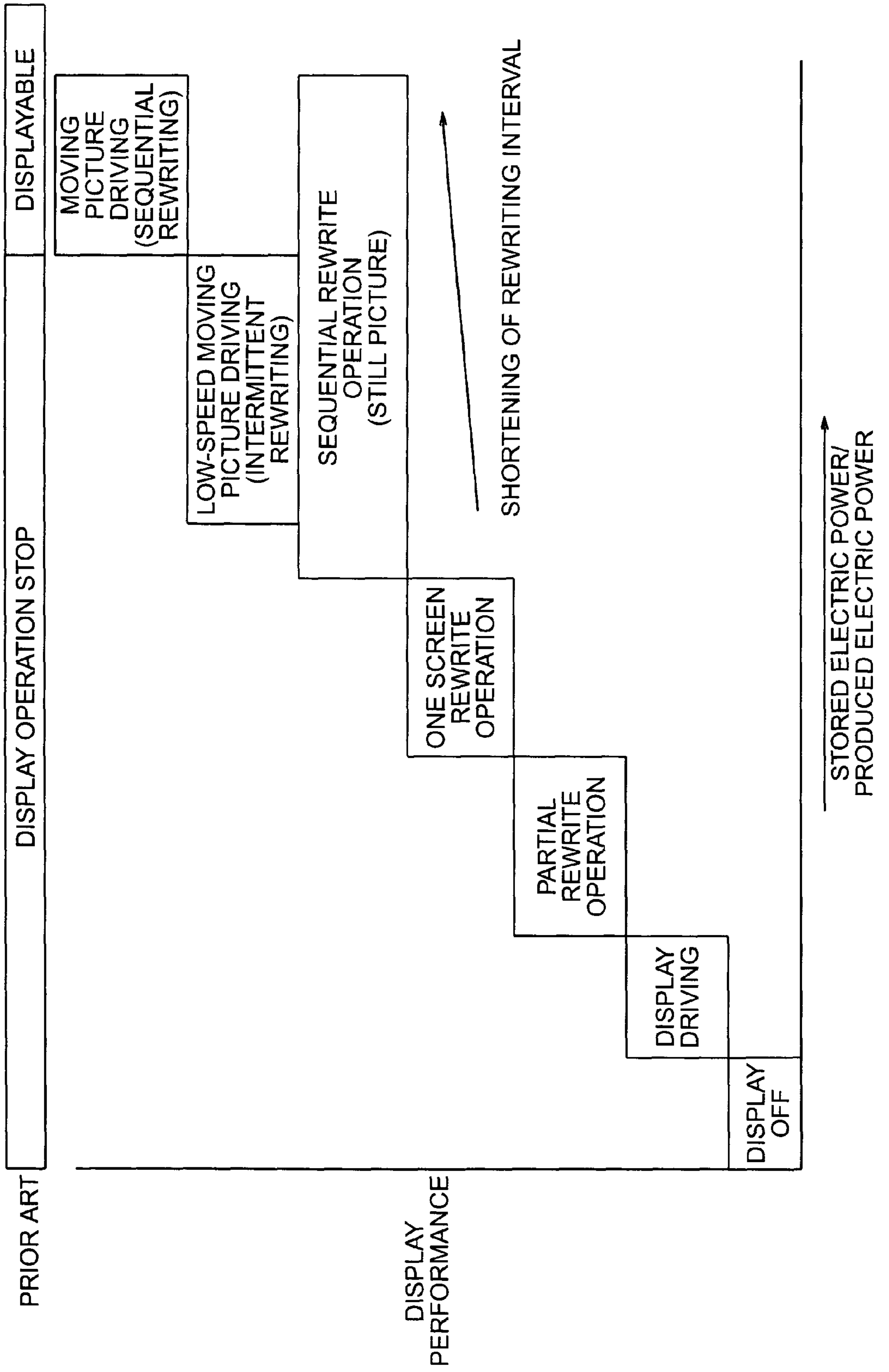
FIG. 10 is an explanatory diagram briefly showing a structure of a stepwise display mode when displaying according to the first embodiment of the invention.

FIG. 10 is an explanatory diagram briefly showing the structure of the stepwise display mode according to the above-described embodiment. In FIG. 10, it is controlled with an increase in an amount of stored electric power to make the rewrite interval shorter gradually from a display drive, a screen rewrite drive, a still picture continuous rewrite drive and a moving picture intermittent drive so to have an ordinary moving picture drive. By driving in such a way, the display mode can be changed to display by low power even if the amount of supplied power changes substantially. A conventional drive method does not control to switch a scanning mode in conjunction with the amount of electric power, so that the display stops when the amount of electricity generated becomes lower than the continuous rewrite level. A partial rewrite operation can be made between the still picture display level and the still picture screen rewrite level. A necessary portion can be rewritten in a substantially display portion only to renew minimum information.

Figure 11:
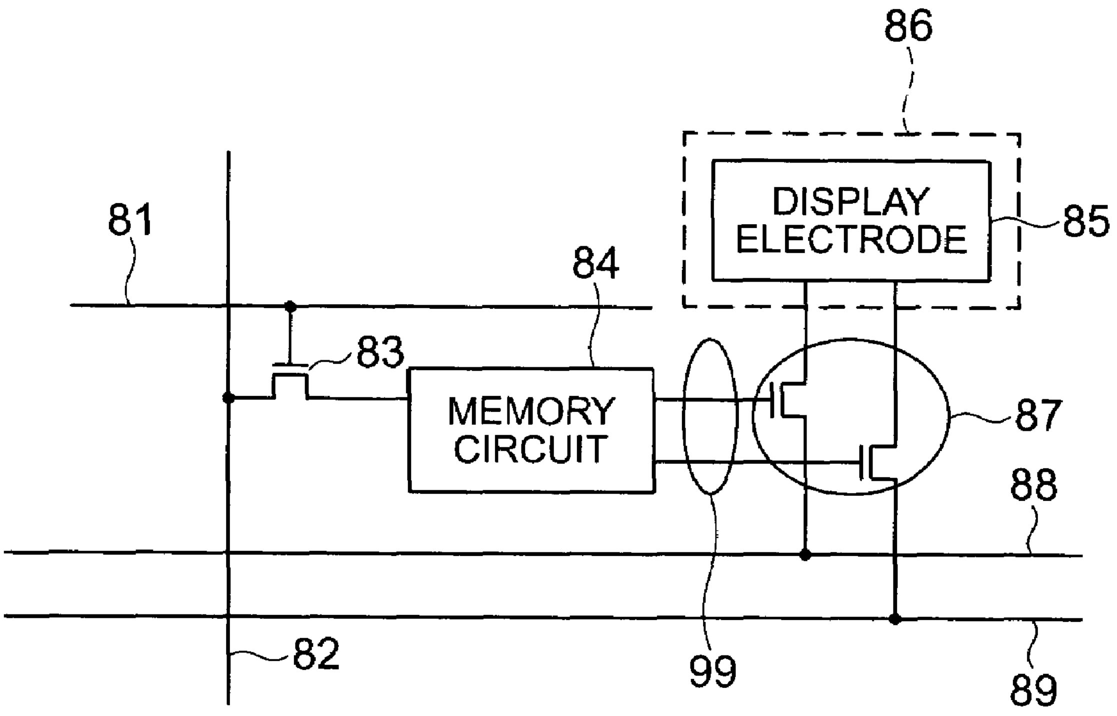
FIG. 11 is an explanatory diagram of a pixel circuit of the display device according to the invention.

FIG. 11 is an explanatory diagram showing the pixel circuit of the display device according to the invention. The pixel contains a liquid crystal which is sandwiched by a display electrode 85 and an opposed electrode 86 formed on the opposed substrate and is driven. The display electrode 85 is formed of a metal film for driving in the reflective liquid crystal display mode. Pixel display data is input to the pixel through signal wiring 82, and a scan signal which is a line sequential selection signal is supplied through scanning wiring 81. When a thin-film transistor (TFT) 83 of the pixel connected to the scanning wiring and the signal wiring is selected by the scan signal, the display data is taken into a memory circuit 84 within the pixel. The memory circuit 84 has a circuit structure of a so-called static RAM. The memory circuit 84 has two output terminals 99 and outputs signals having opposite polarities depending on a stored state.

Two drive TFTs 87 are connected to the display electrode 85. They are connected to off voltage wiring 88 or on voltage wiring 89, and one of them becomes on depending on the stored state, so that the voltage of the off voltage wiring 88 or the on voltage wiring 89 can be applied selectively to the display electrode 85. The off voltage wiring 88 and the on voltage wiring 89 are mutually connected, 0V is applied to the off voltage wiring 88, and an AC liquid crystal drive voltage of a driving threshold value or more is applied to the on voltage wiring 89. And, 0V is kept applied to the opposed electrode 86. Thus, in the pixel, it can be driven to apply 0V or a liquid crystal drive voltage to the display electrode 85 according to data stored in the memory circuit 84 so to drive to have two states of lighting and non-lighting.

Figure 12:
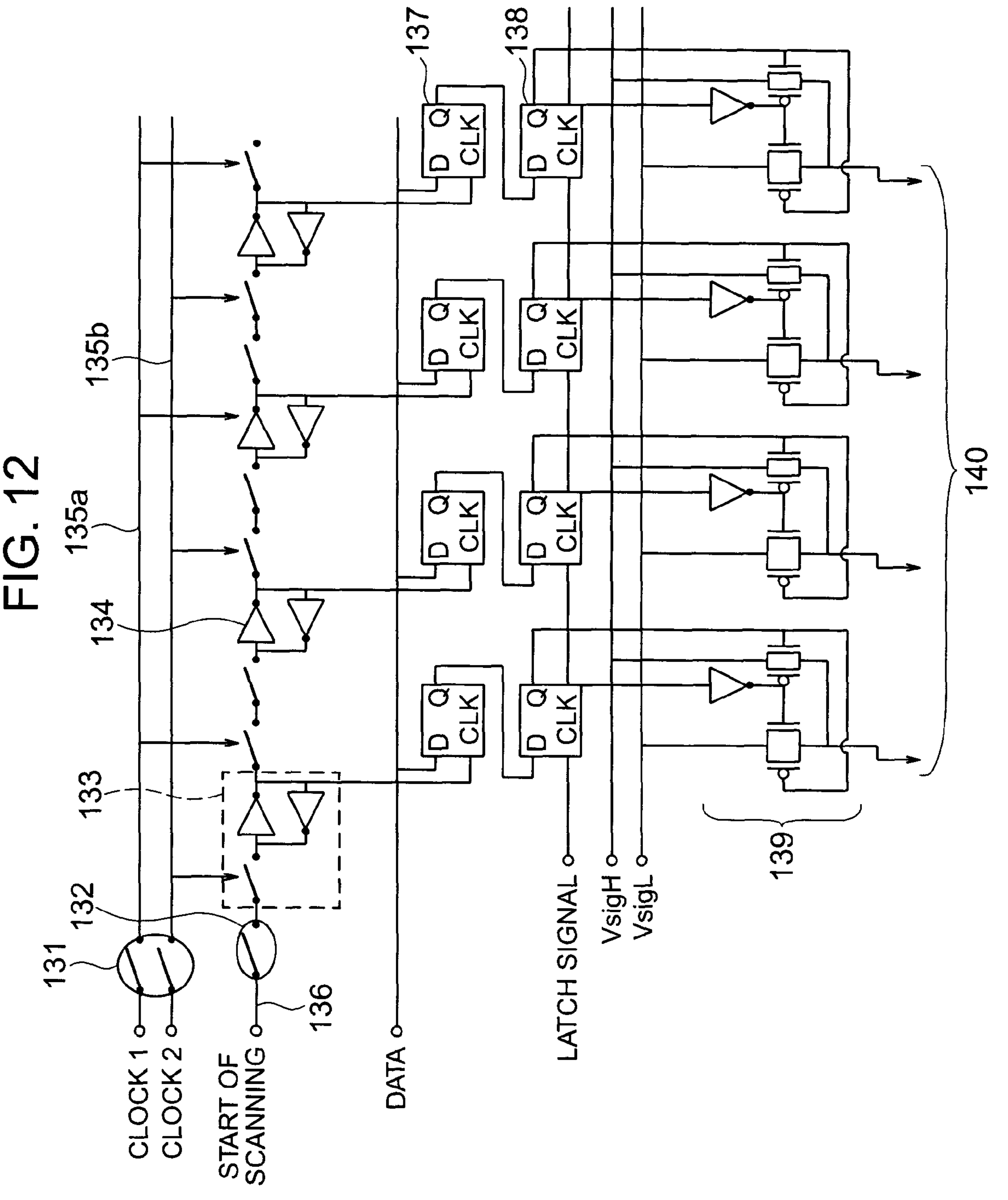
FIG. 12 is a circuit diagram illustrating a structure of a driving circuit disposed on the periphery of the display unit of the display device according to the invention.

FIG. 12 is a circuit diagram showing a structure of the driving circuit disposed on the periphery of the display unit. The driving circuit is comprised of a shift register 133 combining a scan start signal 136 and an inverter circuit 134 driven by clock 1 wiring 135*a* and clock 2 wiring 135*b*, a sampling latch 137 for taking data, a line latch 138 and a data switch 139 for converting data into the data voltage of the display unit. Data makes to start the operation of the shift register according to the scan start signal 136, data on each pixel is sent through the data line in synchronization with it and taken into the sampling latch 137.

A latch signal is input when one line of data becomes available to transfer data to the line latch 138. Output 140 to drive the display unit is connected to data wiring of the display unit. Switches 131, 132 are disposed on the input side of clock and scan start signals, and it is controlled to turn on when an image can be rewritten, and it is controlled to rewrite a display.

Then, a second embodiment of the invention will be described. The former embodiment has a liquid crystal display panel for the display unit, but this embodiment has an electrophoretic display panel. The electrophoretic display panel has a display system for displaying by dispersing electrically charged fine particles in an insulating medium between the display electrode and the opposed electrode and moving the fine particles to aggregate to the display electrode or the opposed electrode by an electric field given from the outside. It has an advantage that the driving can be conducted by electric power lower than that for the liquid crystal display panel because the display can be maintained for a long time even if no electric field is available from the outside until the display is rewritten after the display is changed. This display device has substantially the same structure as that of the first embodiment on the points that its element structure uses a display element held between two substrates and the like. But the pixel circuit configuring the matrix display unit is different.

Figure 13:
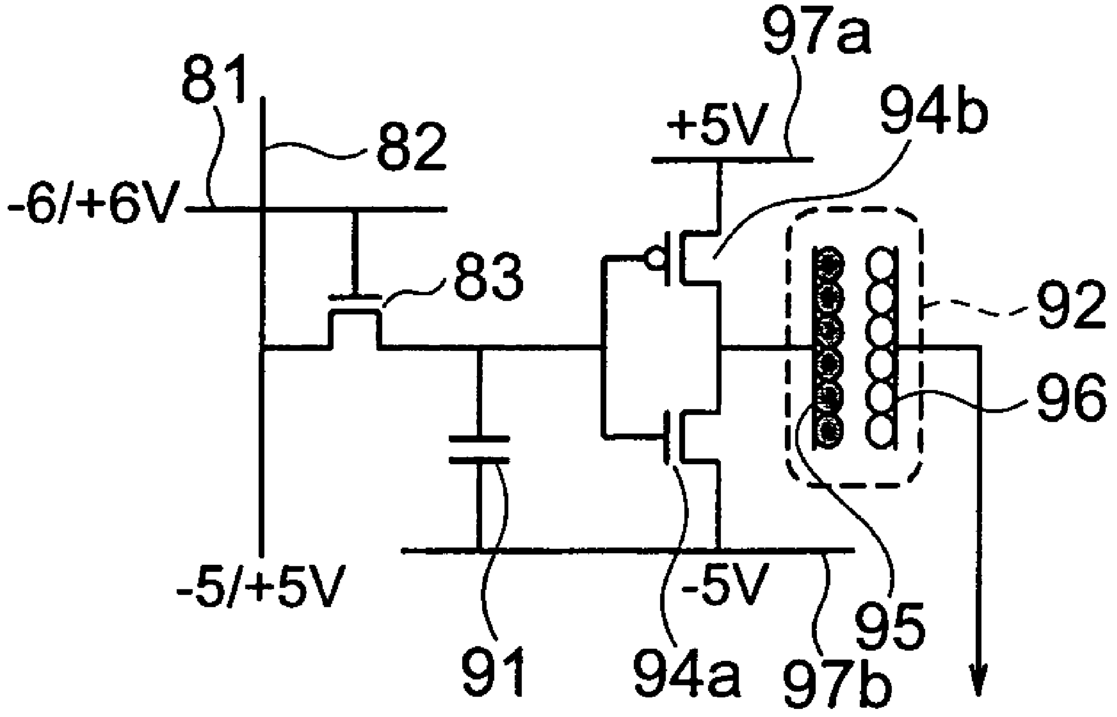
FIG. 13 is an explanatory diagram of a pixel structure of an electrophoretic display panel according to a second embodiment of the invention.

FIG. 13 is a circuit diagram of a pixel structure of the electrophoretic display panel according to the second embodiment of the invention. In FIG. 13, the scanning wiring 81, the data wiring 82 and the thin-film transistor (TFT) 83 of the pixel are the same as those shown in FIG. 11, but a data voltage is stored in a holding capacitor 91 and connected to a display electrode 95 via an inverter which is comprised of CMOS TFTs 94*a*, 94*b*. The inverter is driven by two power supply wiring 97*a*, 97*b*. Here, an electrode common to one power wiring and the holding capacitor 91 is connected to common wiring to reduce the number of wiring. In this configuration, the written data voltage is reverse-amplified by the inverter to drive an electrophoretic element 96. Rewriting is conducted in a short time selected by a scan signal, and the response of an electrophoretic element 92 involves the movement of fine particles, so that the response does not complete. Because the element is driven for a holding period of storing within the pixel by the holding capacitor 91 and the inverter even after the termination of selection, there is an advantage that the element can be driven by applying a voltage for a sufficient time even if the response by the electrophoretic element 92 is slow, and the response time of the electrophoretic element 92 is compensated.

Figure 14:
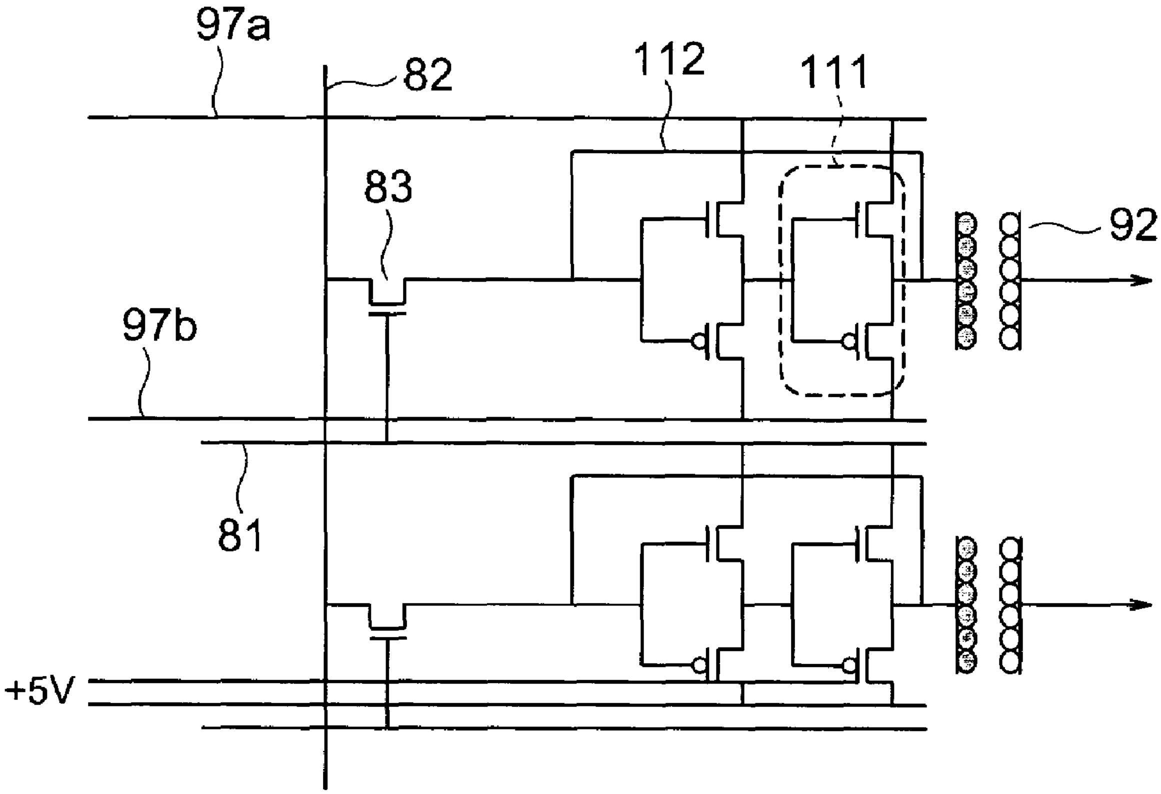
FIG. 14 is an explanatory diagram of a modified example of the pixel circuit according to the second embodiment of the invention.

FIG. 14 shows a modified example of the pixel circuit of the second embodiment of the invention. It shows that a holding inverter 111 and feedback wiring 112 are added to the structure shown in FIG. 13. The holding inverter 111 configures a data holding circuit in combination with the inverter of the former stage, so that there is an advantage that the rewritten data can be held without performing a rewrite operation while the power is being supplied. It is needless to say that the same configuration can be applied to a display device using as the liquid crystal display panel a transmissive type or a transflective and reflective type or a liquid crystal display device having a so-called backlight on the back of the liquid crystal display panel.

Figure 15:
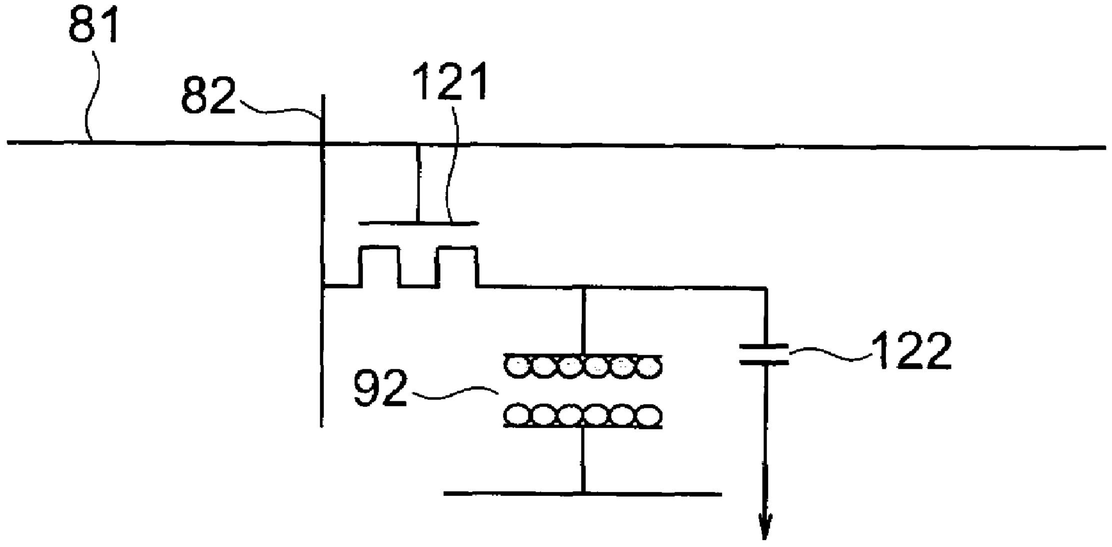
FIG. 15 is an explanatory diagram of another modified example of the pixel circuit according the second embodiment of the invention.

FIG. 15 shows another modified example of the pixel circuit of the second embodiment of the invention. FIG. 15 shows the pixel circuit which is comprised of a TFT 121 for sampling and an auxiliary capacitance 122. The voltage of data written in the pixel is suppressed from varying by having the auxiliary capacitance 122 connected in parallel to the electrophoretic element 92 to compensate the electrophoretic element voltage from lowering with time because the fine particles move beyond the termination of selection. The sampling TFT 121 is suitably a double gate TFT in order to obtain a holding property. For driving the display device which is configured using the above pixel circuit, the power control is different because no power is required to maintain the display.

Figure 16:
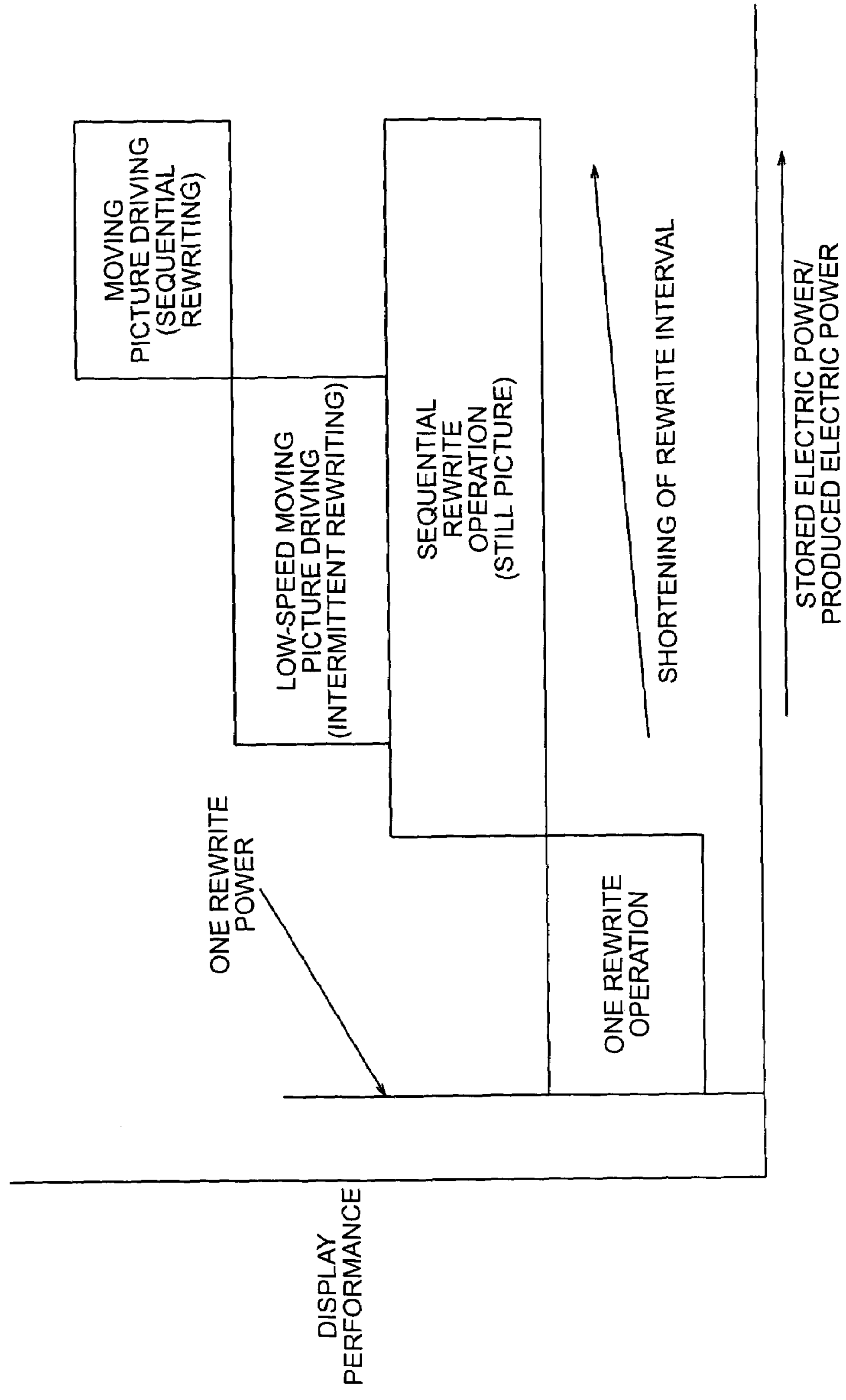
FIG. 16 is a diagram illustrating a relationship between an amount of stored electric power and a drive mode according to the second embodiment of the invention.

FIG. 16 shows a relationship between an amount of stored electric power and a drive mode according to the second embodiment of the invention. As shown in FIG. 16, a display maintaining level is absent when the amount of electricity generated is not more than the still picture rewrite power, and the driving can be conducted by the power lower than that for the liquid crystal. It is because where a liquid crystal display panel is used, the liquid crystal drive voltage is always required as described with reference to FIG. 11, but where an electrophoretic display panel is used, the display maintaining power is not required. Therefore, it is also apparent from the fact that the display light off and display drive regions of FIG. 10 do not exist in FIG. 16.

As described above, a display device, which has very low power consumption and can vary an image rewrite speed and the number of pixels depending on the supplied power, can be provided by the invention. And, by the display device of the invention, even when the solar cell, whose generated electric power is considerably variable depending on the environment, is used, a display can be made even under the environment where letters are scarcely readable, the switch operation allows to display a still picture clearly in room light, and it becomes possible to switch smoothly the image display between a bright place and a dark place by the switch operation.

Besides, a display device, which can consecutively change a display content in a bright place and can provide a display rich in information amount such as a motion picture, and a portable display device, which can be used without being bothered with the connection of the power wiring or recharging, can be easily configured. And, the present invention can make the display device thin and lightweight because the battery does not become dead even if the display device is kept on and a capacity of a heavy and bulky secondary battery can be reduced considerably as compared with that of an existing one.

According to the invention, a display device with self-contained power regardless of a low capacity of its mounted power buffer, with remarkable portability and with no limited battery life can be provided.

And, the display device according to the invention has characteristics that it does not require management of the power supply and, when the environmental light is enough, the display capacity, image quality and information amount become rich. And, a reasonable display device, whose display control is conducted according to man's visual ability, can be provided.

It is to be understood that the present invention is not limited to the above-described aspects and embodiments but can be modified in various ways without departing from the technical ideas of the invention.

What is claimed is:

1. A display device comprising a power supply unit for supplying power, a display unit for displaying an image, a data input circuit for inputting display data corresponding to an image to be displayed on the display unit, a data buffer for storing the input display data, rewrite input means for requesting a change in the display content of the display unit and a control circuit, wherein:

said power supply unit includes a power supply which varies a power supply ability with time or has average produced power lower than average power required to rewrite one screen, a power storage unit which as a capacity of stored electric power for holding power higher than the average power required to rewrite one screen and a stored power detecting circuit which detects an amount of electric power stored in said power storage unit;

said power supply is connected to said display unit via said power storage unit;

said display unit includes a matrix display area, in which a large number of pixels having an optical modulating function capable of changing brightness, a reflectance, a transmittance and colors by a voltage or a current are arranged in a matrix, and a driving circuit including a sequence circuit for driving the matrix display area;

said pixels have a pixel memory for holding display data and are driven according to a pixel rewrite period for rewriting a display content of said display unit and a pixel holding period for holding the display content; and said control circuit controls said driving circuit to rewrite a still screen by rewriting a pixel display content when said stored power detecting circuit outputs a stored power detection signal indicative of a detected amount of stored electric power not less than the average power required for at least rewriting of a screen of the display unit, and said control circuit controls the driving circuit so as to rewrite the pixel display content of the display unit repetitively by rewriting the screen continuously to thereby display a moving picture, when said stored power detecting circuit detects a stored power detection signal indicative of a detected amount of stored electric power not less than the average power required to rewrite the screen continuously.

2. The display device according to claim 1, wherein said power supply is a solar cell.

3. The display device according to claim 2, wherein said solar cell is a thin-film solar cell formed on the same substrate as the display unit is formed.

4. The display device according to claim 2, wherein the solar cell is an organic thin-film solar cell formed on the same substrate as the display unit is formed.

5. The display device according to claim 1, wherein said pixel circuit built in the pixels of said display unit and said driving circuit for driving the display unit are thin-film transistors.

6. A display device comprising a power supply unit for supplying power, a display unit for displaying an image, rewrite input means for requesting a change in the display content of the display unit, a data input circuit for inputting display data corresponding to an image to be displayed on the display unit, a data buffer for storing the input display data and a control circuit, wherein:

said power supply unit includes a power supply which varies a power supply ability with time or has average produced power lower than average power required to rewrite one screen, a power storage unit which has a capacity of stored electric power for holding power higher than the average power required to rewrite one screen and a stored power detection circuit which detects an amount of electric power stored in the power storage unit;

said power supply is connected to the display unit via the power storage unit;

said display unit includes a matrix display area, in which a large number of pixels having an optical modulating function capable of changing brightness, a reflectance, a transmittance and colors by a voltage or a current are arranged in a matrix, and a driving circuit including a sequence circuit for driving the matrix display area;

said driving circuit is stopped to stop rewriting the screen of the display unit when a stored power detection signal having detected an amount of stored electric power not more than the average power required for at least rewriting of a screen of the display unit is output from the stored power detecting circuit;

said driving circuit is controlled to rewrite a still screen so as to rewrite the screen by rewriting a pixel display content when a stored power detection signal indicative of a detected amount of stored electric power not less than the average power required for at least rewriting of a screen of the display unit is output from the stored power detecting circuit; and said control circuit controls the driving circuit to rewrite a screen of the display unit so as to display a moving picture by rewriting the pixel display content continuously when the stored power detecting circuit detects a stored power detection signal indicative of a detected amount of stored electric power not less than the average power required to rewrite the screen continuously.

7. The display device according to claim 6, wherein said power supply is a solar cell.

8. The display device according to claim 7, wherein said solar cell is a thin-film solar cell formed on the same substrate as the display unit is formed.

9. The display device according to claim 7, wherein the solar cell is an organic thin-film solar cell formed on the same substrate as the display unit is formed.

10. The display device according to claim 6, wherein said pixel circuit built in the pixels of said display unit and said driving circuit for driving the display unit are thin-film transistors.

* * * * *